United States Patent [19]

Ewing et al.

[11] Patent Number: 5,625,241

[45] Date of Patent: Apr. 29, 1997

[54] CAROUSEL ELECTRIC GENERATOR

[75] Inventors: Harold E. Ewing, Chandler; Russell R. Chapman; David R. Porter, both of Mesa, all of Ariz.

[73] Assignee: Energy Research Corporation, Mesa, Ariz.

[21] Appl. No.: 281,552

[22] Filed: Jul. 28, 1994

[51] Int. Cl.⁶ .................................................. H02K 21/12
[52] U.S. Cl. .......................... 310/156; 310/152; 310/266; 310/268; 310/258; 310/261; 310/67 R; 310/179; 310/181
[58] Field of Search .................................. 310/112, 113, 310/114, 152, 156, 162, 179, 180, 181, 254, 266, 268, 67 R, 192, 194, 258, 259

[56] References Cited

U.S. PATENT DOCUMENTS

| | | | |
|---|---|---|---|
| 3,610,974 | 10/1971 | Kenyon | 310/49 |
| 4,547,713 | 10/1985 | Langley et al. | 318/254 |
| 5,117,142 | 5/1992 | Von Zweygbergk | 310/156 |
| 5,289,072 | 2/1994 | Lange | 310/266 |
| 5,293,093 | 3/1994 | Warner | 310/254 |
| 5,304,883 | 4/1994 | Denk | 310/180 |

*Primary Examiner*—Steven L. Stephan
*Assistant Examiner*—Karl I. E. Tamai
*Attorney, Agent, or Firm*—Warren F. B. Lindsley

[57] ABSTRACT

A permanent magnet generator or motor having stationary coils positioned in a circle, a rotor on which are mounted permanent magnets grouped in sectors and positioned to move adjacent said coils, and a carousel carrying corresponding groups of permanent magnets through the centers of said coils, the carousel moving with the rotor by virtue of its being magnetically coupled therewith.

22 Claims, 5 Drawing Sheets

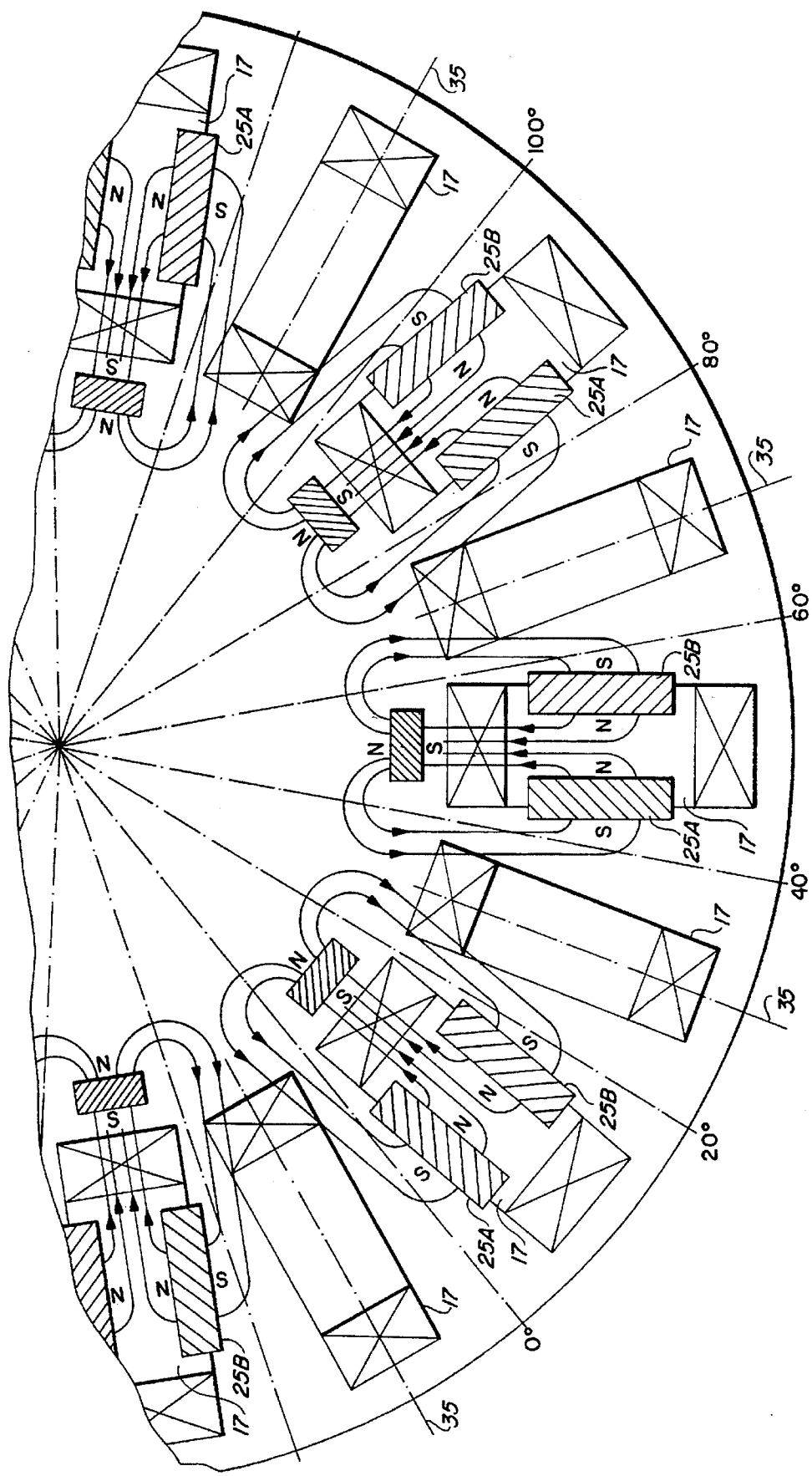

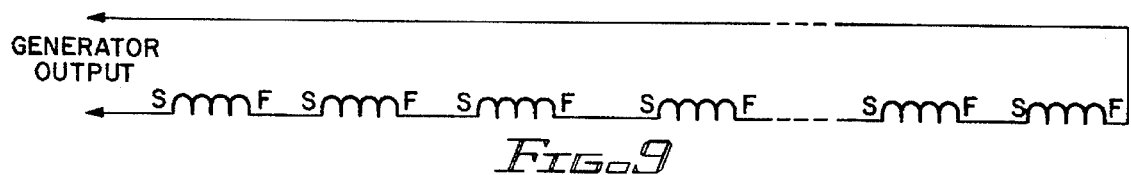
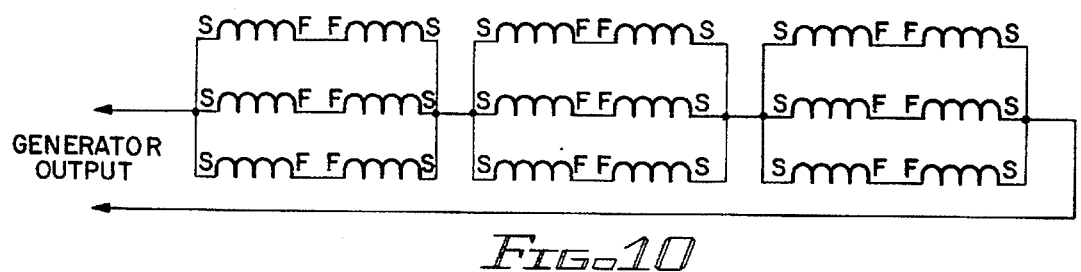
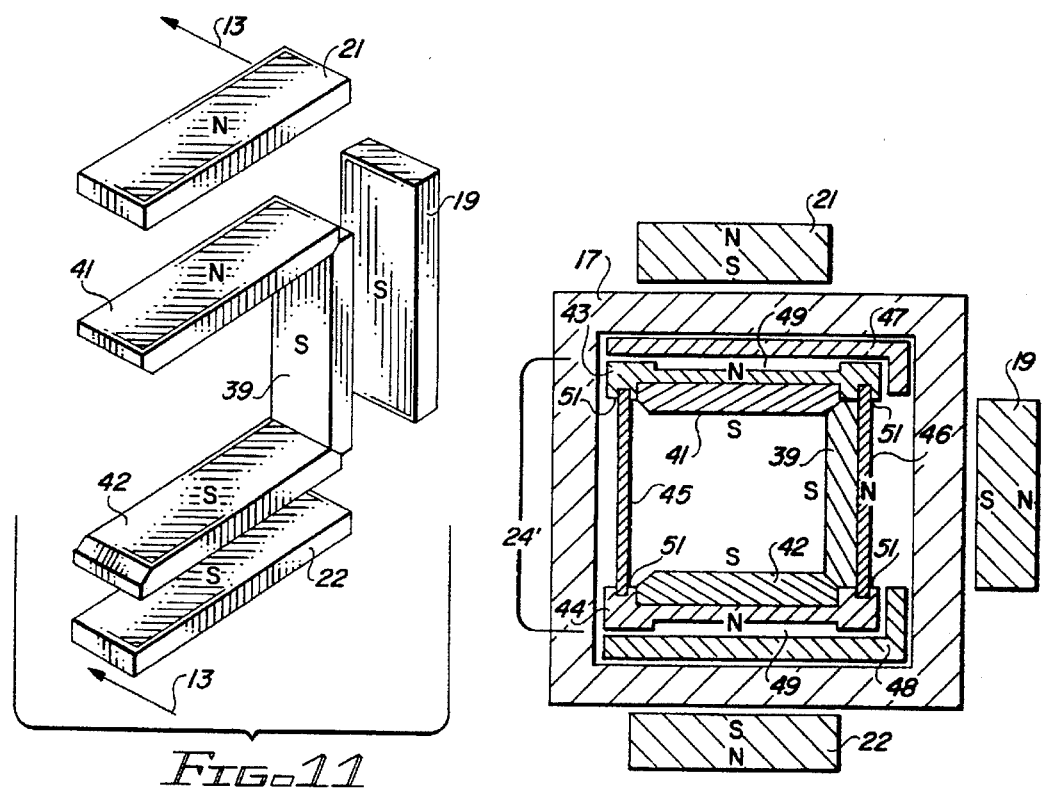
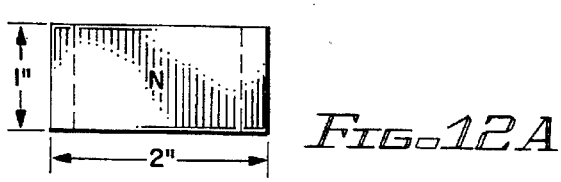

CAROUSEL ELECTRIC GENERATOR

BACKGROUND OF THE INVENTION

There are numerous applications for small electric generators in ratings of a few kilowatts or less. Examples include electric power sources for emergency lighting in commercial and residential buildings, power sources for remote locations such as mountain cabins, and portable power sources for motor homes, pleasure boats, etc.

In all of these applications, system reliability is a primary concern. Because the power system is likely to sit idle for long periods of time without the benefit of periodic maintenance, and because the owner-operator is often inexperienced in the maintenance and operation of such equipment, the desired level of reliability can only be achieved through system simplicity and the elimination of such components as batteries or other secondary power sources which are commonly employed for generator field excitation.

Another important feature for such generating equipment is miniaturization particularly in the case of portable equipment. It is important to be able to produce the required level of power in a relatively small generator.

Both of these requirements are addressed in the present invention through a novel adaptation of the permanent magnet generator or magneto in a design that lends itself to high frequency operation as a means for maximizing power output per unit volume.

DESCRIPTION OF THE PRIOR ART

Permanent magnet generators or magnetos have been employed widely for many years. Early applications of such generators include the supply of electric current for spark plugs in automobiles and airplanes. Early telephones used magnetos to obtain electrical energy for ringing. The Model T Ford automobile also used magnetos to power its electric lights.

The present invention differs from prior art magnetos in terms of its novel physical structure in which a multiplicity of permanent magnets and electrical windings are arranged in a fashion which permits high-speed/high-frequency operation as a means for meeting the miniaturization requirement. In addition, the design is enhanced through the use of a rotating carousel which carries a multiplicity of field source magnets through the centers of the stationary electric windings in which the generated voltage is thereby induced.

SUMMARY OF THE INVENTION

In accordance with the invention claimed, an improved permanent magnet electric generator is provided with a capability for delivering a relatively high level of output power from a small and compact structure. The incorporation of a rotating carousel for the transport of the primary field magnets through the electrical windings in which induction occurs enhances field strength in the locations critical to generation.

It is, therefore, one object of this invention to provide an improved permanent magnet generator or magneto for the generation of electrical power.

Another object of this invention is to provide in such a generator a relatively high level of electrical power from a small and compact structure.

A further object of this invention is to achieve such a high level of electrical power by virtue of the high rotational speed and high frequency operation of which the generator of the invention is capable.

A further object of this invention is to provide such a high frequency capability through the use of a novel field structure in which the primary permanent magnets are carried through the centers of the induction windings of the generator by rotating carousel.

A still further object of this invention is to provide a means for driving the rotating carousel without the aid of mechanical coupling but rather by virtue of magnetic coupling between other mechanically driven magnets and those mounted on the carousel.

A still further object of this invention is to provide an enhanced capability for high speed/high frequency operation through the use of an air bearing as a support for the rotating carousel.

Yet another object of this invention is to provide in such an improved generator a sufficiently high magnetic field density in the locations critical to voltage generation without resort to the use of laminations or other media to channel the magnetic field.

Further objects an advantages of the invention will become apparent as the following description proceeds and the features of novelty which characterize the invention will be pointed out with particularity in the claims annexed to and forming a part of this specification.

BRIEF DESCRIPTION OF THE DRAWINGS

The present invention may be more readily described by reference to the accompanying drawing, in which:

FIG. 6 is an illustration of the physical arrangement of electrical windings and permanent magnets within the generator of the invention as viewed in the direction of arrow 6 in FIG. 1;

FIG. 9 is a schematic diagram showing a series connection of generator coils for a low current, high voltage configuration;

FIG. 10 is a schematic diagram showing a series/parallel connection of generator windings for intermediate current and voltage operation;

FIG. 11 is a perspective presentation of a modified carousel magnet configuration employed in a second embodiment of the invention;

FIGS. 12A and 12B show upper and lower views of the carousel magnets of FIG. 11;

FIG. 13 is a cross-sectional view of the modified magnet configuration of FIG. 11 taken along line 13—13 with other features of the modified carousel structure also shown;

DESCRIPTION OF THE PREFERRED EMBODIMENT

Figure 1:
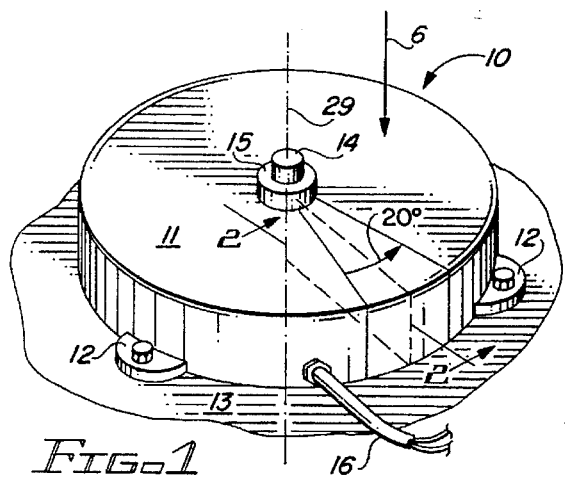
FIG. 1 is a simplified perspective view of the carousel electric generator of the invention.

Referring more particularly to the drawings by characters of reference, FIG. 1 discloses the external proportions of a carousel electric generator 10 of the invention. As shown in FIG. 1, generator 10 is enclosed by a housing 11 with mounting feet 12 suitable for securing the generator to a flat surface 13. The surface 13 is preferably horizontal, as shown in FIG. 1.

Housing 11 has the proportions of a short cylinder. A drive shaft 14 extends axially from housing 11 through a bearing 15. The electrical output of the generator is brought out through a cable 16.

Figure 2:
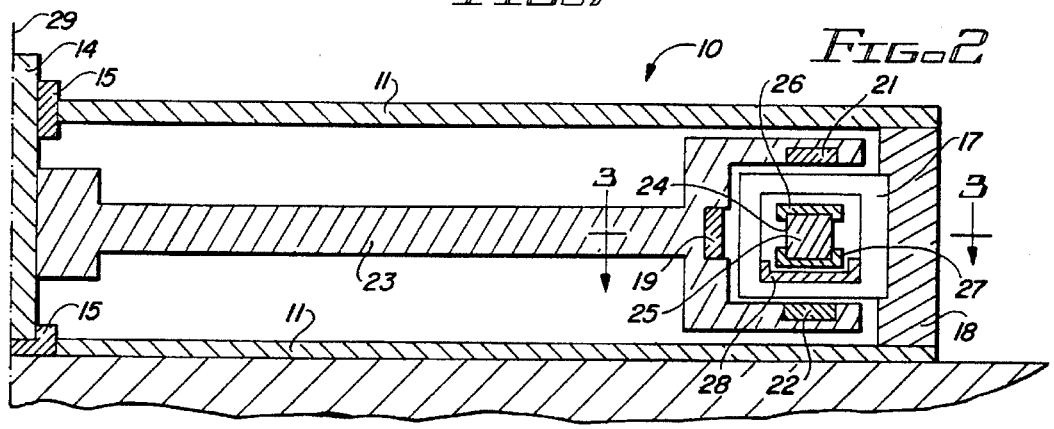
FIG. 2 is a cross-sectional view of FIG. 1 taken along line 2—2.

The cross-sectional view of FIG. 2 shows the active elements incorporated in one twenty degree sector of the stator and in one twenty degree sector of the rotor.

In the first implementation of the invention, there are eighteen identical stator sectors, each incorporating a winding or coil 17 wound about a rectangular coil frame or bobbin. Coil 17 is held by a stator frame 18 which may also serve as an outer wall of frame 11.

The rotor is also divided into eighteen sectors, nine of which incorporate three permanent magnets each, including an inboard rotor magnet 19, an upper rotor magnet 21 and a lower rotor magnet 22. All three of these magnets are oriented with their south poles facing coil 17, and all three are mounted directly to rotor frame 23 which is secured directly to drive shaft 14.

The other nine sectors of the rotor are empty, i.e. they are not populated with magnets. The unpopulated sectors are alternated with the populated sectors so that adjacent populated sectors are separated by an unpopulated sector as shown in FIGS. 3 and 6.

With reference again to FIG. 2, generator 10 also incorporates a carousel 24. The carousel comprises nine pairs of carousel magnets 25 clamped between upper and lower retainer rings 26 and 27, respectively. The lower retainer ring 27 rests inside an air bearing channel 28 which is secured to stator 18 inside the bobbin of coil 17. Air passages (not shown) admit air into the space between the lower surface of ring 27 and the upper or inside surface of channel 28. This arrangement comprises an air bearing which permits carousel 24 to rotate freely within the coils 17 about rotational axis 29 of rotor frame 23.

Carousel 24 is also divided into 18 twenty degree sectors, including nine populated sectors interspersed with nine unpopulated sectors in an alternating sequence. Each of the nine populated sectors incorporates a pair of carousel magnets as described in the preceding paragraph.

Figure 4:
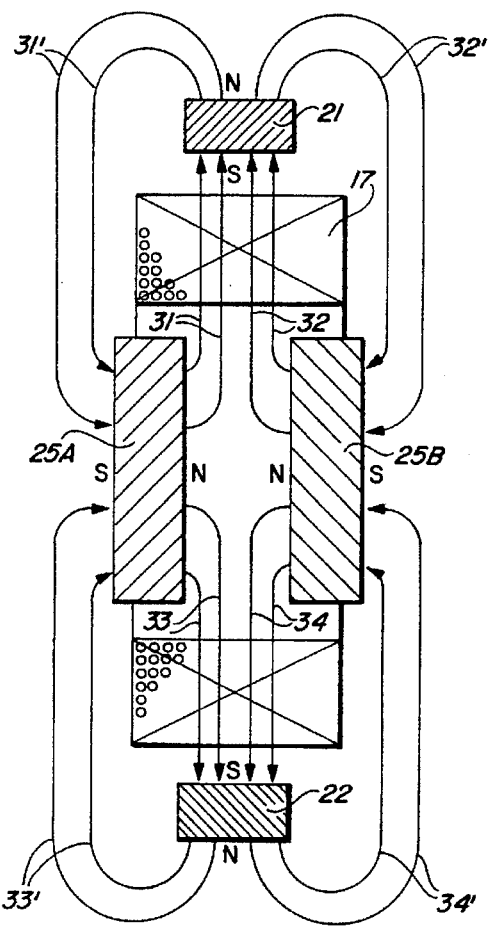
FIG. 4 is a cross-sectional view of FIG. 3 taken along line 4—4.
Figure 3:
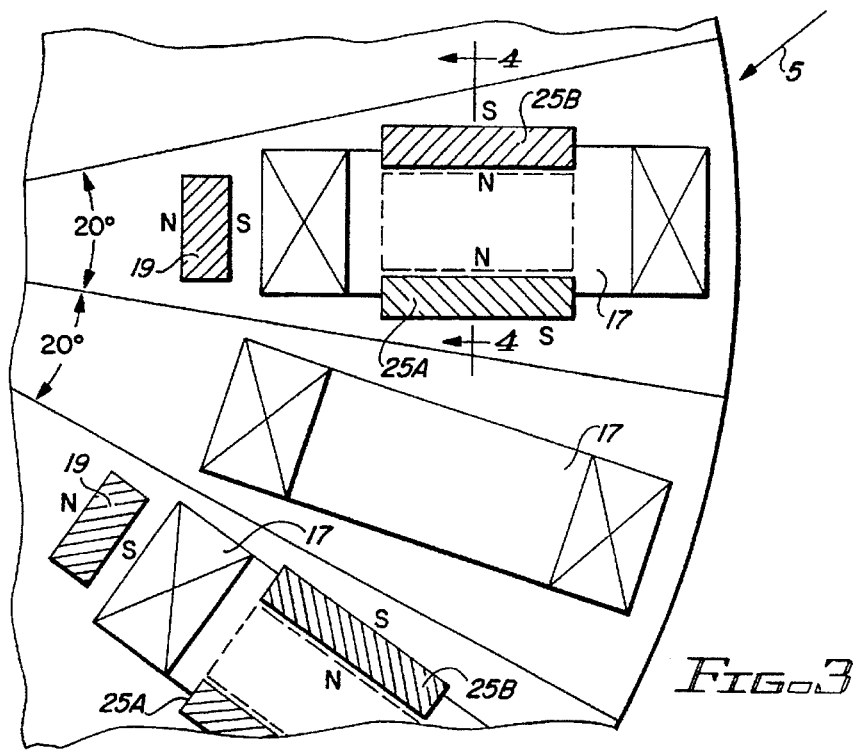
FIG. 3 is a cross-sectional view of the generator of FIGS. 1 and 2 taken along line 3—3 of FIG. 2.
Figure 5:
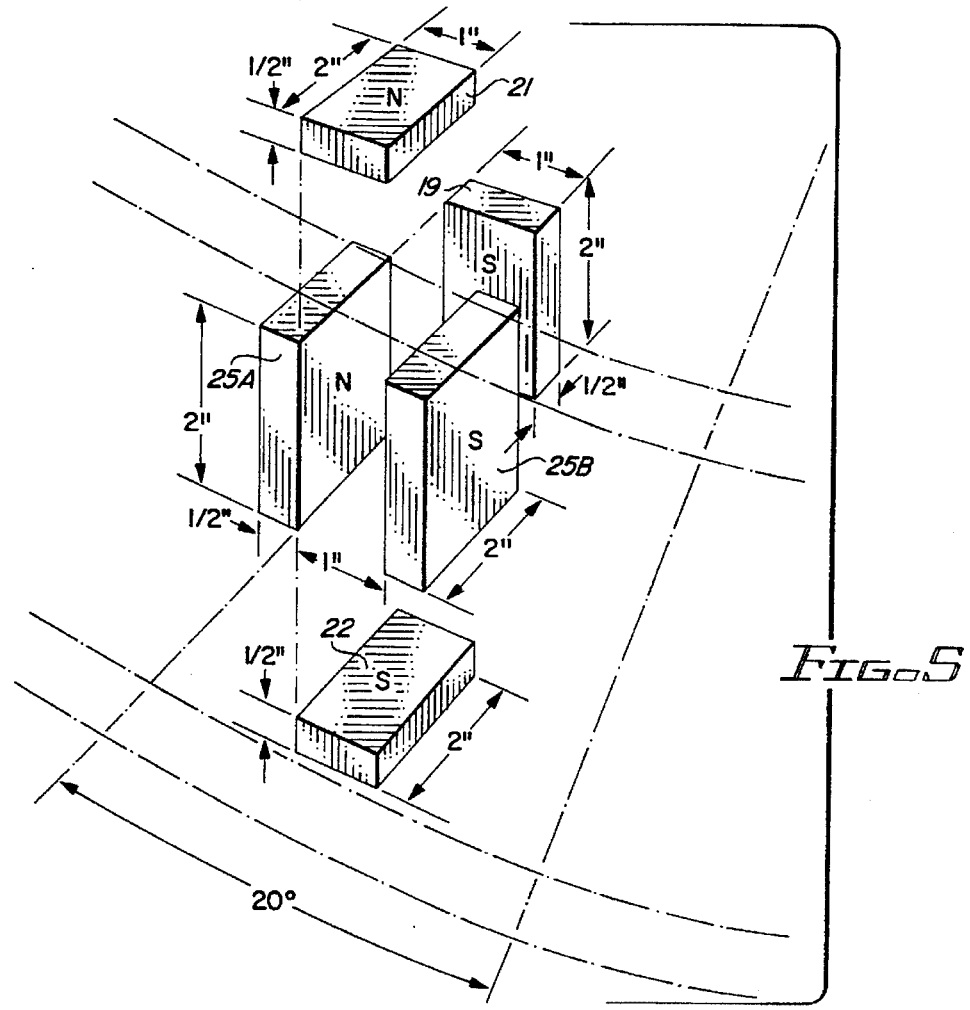
FIG. 5 is a partial perspective view showing the orientation of a group of permanent magnets within a 20 degree sector of the generator of the invention as viewed in the direction of arrow 5 of FIG. 3.

The geometrical relationship between the rotor magnets, the carousel magnets and the coils is further clarified by FIGS. 3, 4 and 5. In each of the three figures, the center of each populated rotor sector is shown aligned with the center of a coil 17. Each populated carousel sector, which is magnetically locked into position with a populated rotor sector is thus also aligned with a coil 17.

In an early implementation of the invention, the dimensions and spacings of the rotor magnets 19, 21 and 22 and carousel magnets, 25A and 25B of carousel magnet pairs 25 were as shown in FIG. 5. Each of rotor magnets 19, 21 and 22 measured one inch by two inches by one-half inch with north and south poles at opposite one-inch by two-inch faces. Each of the carousel magnets 25A and 25B measured two inches by two inches by one-half inch with north and south poles at opposite two-inch by two-inch faces. The magnets were obtained from Magnet Sales and Manufacturing, Culver City, Calif. The carousel magnets were part No. 35NE2812832; the rotor magnets were custom parts of equivalent strength (MMF) but half the cross section of the carousel magnets.

Coil supports and other stationary members located within magnetic field patterns are fabricated from Delrin or Teflon plastic or equivalent materials. The use of aluminum or other metals introduce eddy current losses and in some cases excessive friction.

As shown in FIG. 5, carousel magnets 25A and 25B stand on edge, parallel with each other, their north poles facing each other, and spaced apart one inch. When viewed from directly above the carousel magnets, the space between the two magnets 25A and 25B appears as a one-inch by two-inch rectangle. When the carousel magnet pair 25 is perfectly locked into position magnetically, upper rotor magnet 21 is directly above this one-inch by two-inch rectangle, lower rotor magnet 22 is directly below it, and their one-inch by two-inch faces are directly aligned with it, the south poles of the two magnets 21 and 22 facing each other.

In like manner, when viewed from the axis of rotation of generator 10, the space between carousel magnets 25A and 25B again appears as a one-inch by two-inch rectangle, and this rectangle is aligned with the one-inch by two-inch face of magnet 19, the south pole of magnet 19 facing the carousel magnet pair 25.

Rotor magnets 19, 21 and 22 are positioned as near as possible to carousel magnets 25A and 25B while still allowing passage for coil 17 over and around the carousel magnets and through the space between the carousel magnets and the rotor magnets.

In an electric generator, the voltage induced in the generator windings is proportional to the product of the number of turns in the winding and the rate of change of flux linkages that is produced as the winding is rotated through the magnetic field. An examination of magnetic field patterns is therefore essential to an understanding of generator operation.

In generator 10, magnetic flux emanating from the north poles of carousel magnets 25A and 25B pass through the rotor magnets and then return to the south poles of the carousel magnets. The total flux field is thus driven by the combined MMF (magnetomotive force) of the carousel and field magnets while the flux patterns are determined by the orientation of the rotor and carousel magnets.

The flux pattern between carousel magnets 25A and 25B and the upper and lower rotor magnets 21 and 22 is illustrated in FIG. 4. Magnetic flux lines 31 from the north pole of carousel magnet 25A extend to the south pole of upper rotor magnet 21, pass through magnet 21 and return as lines 31' to the south pole of magnet 25A. Lines 33, also from the north pole of magnet 25A extend to the south pole of lower rotor magnet 22, pass through magnet 22 and return to the south pole of magnet 25A as lines 33'. Similarly, lines 32 and 34 from the north pole of magnet 25B pass through magnets 21 and 22, respectively, and return as lines 32' and 34' to the south pole of magnet 25B. Flux linkages produced in coil 17 by lines emanating from carousel magnet 25A are of opposite sense from those emanating from carousel magnet 25B. Because induced voltage is a function of the rate of change in net flux linkages it is important to recognize this difference in sense.

FIG. 6 shows a similar flux pattern for flux between carousel magnets 25A and 25B and inboard rotor magnet 19. Again the lines emanating from carousel magnet 25A and passing through rotor magnet 19 produce flux linkages in coil 17 that are opposite in sense from those produced by lines from magnet 25B.

The arrangement of the carousel magnets with the north poles facing each other tends to confine and channel the flux into the desired path. This arrangement replaces the function of magnetic yokes or laminations of more conventional generators.

The flux linkages produced by magnets 25A and 25B are opposite in sense regardless of the rotational position of coil 17 including the case where coil 17 is aligned with the carousel and rotor magnets as well as for the same coils when they are aligned with an unpopulated rotor sector.

Figure 7:
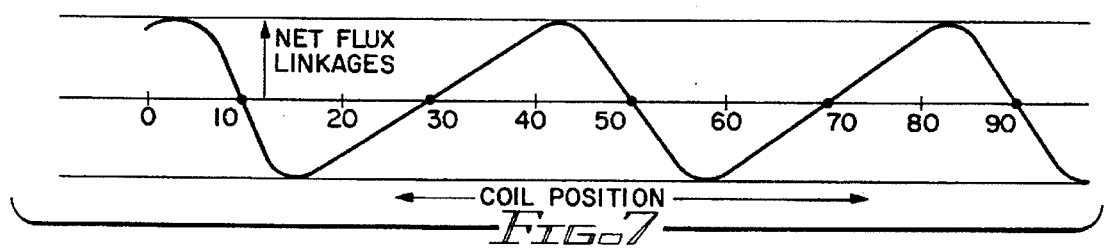
FIG. 7 is a wave form showing flux linkages for a given winding as a function of rotational position of the winding relative to the permanent magnets.

Taking into account the flux patterns of FIGS. 4 and 6 and recognizing the opposing sense conditions just described, net flux linkages for a given coil 17 are deduced as shown in FIG. 7.

In FIG. 7, net flux linkages (coil turns×lines) are plotted as a function of coil position in degrees. Coil position is here defined as the position of the centerline 35 of coil 17 relative to the angular scale shown in degrees in FIG. 6. (Note that the coil is stationary and the scale is fixed to the rotor. As the rotor turns in a clockwise direction, the relative position of coil 17 progresses from zero to ten to twenty degrees etc.).

At a relative coil position of ten degrees, the coil is centered between magnets 25A and 25B. Assuming symmetrical flux patterns for the two magnets, the flux linkages from one magnet exactly cancel the flux linkages from the other so that net flux linkages are zero. As the relative coil position moves to the right, linkages from magnet 25A decrease and those from magnet 25B increase so that net flux linkages build up from zero and passes through a maximum negative value at some point between ten and twenty degrees. After reaching the negative maximum, flux linkages decrease, passing through zero at 30 degrees (where coil 17 is at the center of an unpopulated rotor sector) and then rising to a positive maximum at some point just beyond 60 degrees. This cyclic variation repeats as the coil is subjected successively to fields from populated and unpopulated rotor sectors.

As the rotor is driven rotationally, net flux linkages for all eighteen coils are altered at a rate that is determined by the flux pattern just described in combination with the rotational velocity of the rotor. Instantaneous voltage induced in coil 17 is a function of the slope of the curve shown in FIG. 7 and rotor velocity, and voltage polarity changes as the slope of the curve alternates between positive and negative.

Figure 8:
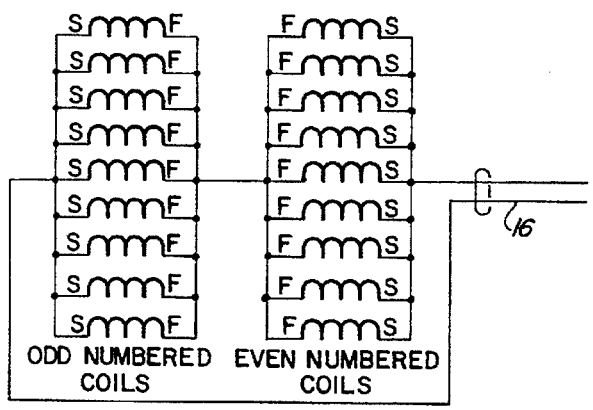
FIG. 8 is a schematic diagram showing the proper connection of the generator windings for a high current low voltage configuration of the generator.

It is important to note here that a coil positioned at ten degrees is exposed to a negative slope while the adjacent coil is exposed to a positive slope. The polarities of the voltages induced in the two adjacent coils are therefore opposite. For series or parallel connections of odd and even-numbered coils, this polarity discrepancy can be corrected by installing the odd and even numbered coils oppositely (odds rotated end for end relative to evens) or by reversing start and finish connections of odd relative to even numbered coils. Either of these measures will render all coil voltages additive as needed for series or parallel connections. Unless the field patterns for populated and unpopulated sectors are very nearly symmetrical, however, the voltages induced in odd and even numbered coils will have different waveforms. This difference will not be corrected by the coil reversals or reverse connections discussed in the previous paragraph. Unless the voltage waveforms are very nearly the same, circulating currents will flow between even and odd-numbered coils. These circulating currents will reduce generator efficiency. To prevent such circulating currents and the attendant loss in operating efficiency for non symmetrical field patterns and unmatched voltage waveforms, the series-parallel connections of FIG. 8 may be employed in a high-current, low-voltage configuration of the generator. If the eighteen coils are numbered in sequence from one to eighteen according to position about the stator, all even-numbered coils are connected in parallel, all odd-numbered coils are connected in parallel, and the two parallel coil groups are connected in series as shown with reversed polarity for one group so that voltages will be in phase relative to output cable 16.

For a low-current, high voltage configuration, the series connection of all coils may be employed as shown in FIG. 9 (circled numbers indicate coil numbers). In this case, it is only necessary to correct the polarity difference between even and odd numbered coils. As mentioned earlier, this can be accomplished by means of opposite start and finish connections for odd and even coils or by installing alternate coils reversed, end for end.

For intermediate current and voltage configurations, various series-parallel connections may be employed. FIG. 10, for example, shows three groups of six coils each connected in series. Numbers shown in FIG. 10 again indicate coil numbers. Circulating currents will be avoided so long as even-numbered coils are not connected in parallel with odd-numbered coils. Parallel connection of series-connected odd/even pairs as shown is permissible because the waveforms of the series pairs should be very neatly matched.

In another embodiment of the invention, the two large (two-inch by two-inch) carousel magnets are replaced by three smaller magnets as shown in FIGS. 11, 12 and 13. The three carousel magnets comprise an inboard carousel magnet 39, an upper carousel magnet 41 and a lower carousel magnet 42 arranged in a U-shaped configuration that matches the U-shaped configuration of the rotor magnets 19, 21 and 22. As in the case of the first embodiment, the rotor and carousel magnets are present only in alternate sectors of the generator.

The ends of the carousel magnets are beveled to permit a more compact arrangement of the three magnets. As shown in FIG. 12, each magnet measures one inch by two inches by one half inch thick. The south pole occupies the beveled one-inch by two-inch face and the north pole is at the opposite face.

The modified carousel structure 24' as shown in FIG. 13 comprises an upper carousel bearing plate 43, a lower carousel bearing plate 44, an outer cylindrical wall 45 and an inner cylindrical wall 46. The upper and lower bearing plates 43 and 44 mate with upper and lower bearing members 47 and 48, respectively, which are stationary and secured inside the forms of the coils 17. Bearing plates 43 and 44 are shaped to provide air channels 49 which serve as air bearings for rotational support of the carousel 24'. The bearing plates are also slotted to receive the upper and lower edges 51 of cylindrical walls 45 and 46.

The modified carousel structure 24' offers a number of advantages over the first embodiment. The matched magnet configuration of the carousel and the rotor provides tighter and more secure coupling between the carousel and the rotor. The smaller carousel magnets also provide a significant reduction in carousel weight. This was found beneficial relative to the smooth and efficient rotational support of the carousel.

Figure 14:
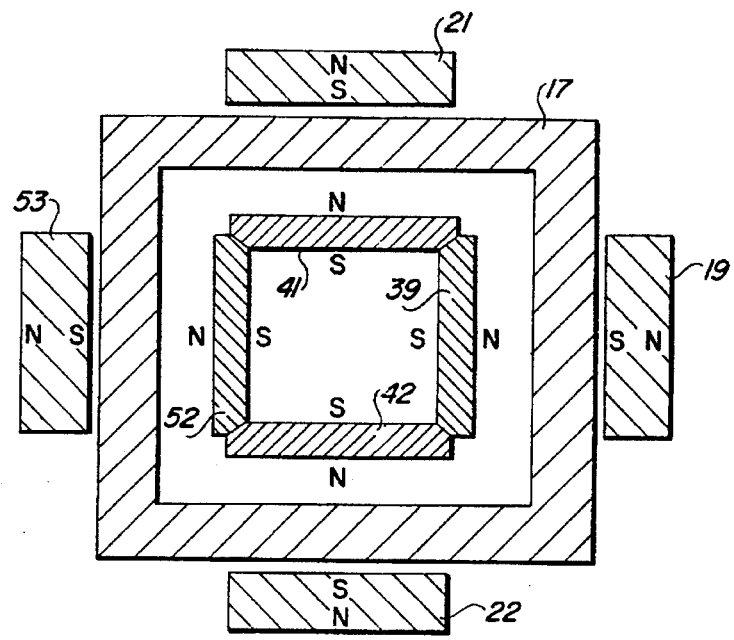
FIG. 14 is a modification of the carousel structure shown in FIGS. 1–13 wherein a fourth carousel magnet is positioned at each station.

The modification of the carousel structure as described in the foregoing paragraphs can be taken one step further with the addition of a fourth carousel magnet 52 at each station as shown in FIG. 14. The four carousel magnets 39, 41, 42 and 52 now form a square frame with each of the magnet faces (north poles) facing a corresponding inside face of the coil 17. Carousel magnets for this modification may again be as shown in FIG. 12. An additional rotor magnet 53 may also be added as shown, in alignment with carousel magnet 52. These additional modifications further enhance the field pattern and the degree of coupling between the rotor and the carousel.

The carousel electric generator of the invention is particularly well suited to high speed, high frequency operation where the high speed compensates for lower flux densities than might be achieved with a magnetic medium for routing the field through the generator coils. For many applications, such as emergency lighting, the high frequency is also advantageous. Fluorescent lighting, for example, is more efficient in terms of lumens per watt and the ballasts are smaller at high frequencies.

While the present invention has been directed toward the provision of a compact generator for specialized generator applications, it is also possible to operate the device as a motor by applying an appropriate alternating voltage source to cable 16 and coupling drive shaft 14 to a load.

Figure 15:
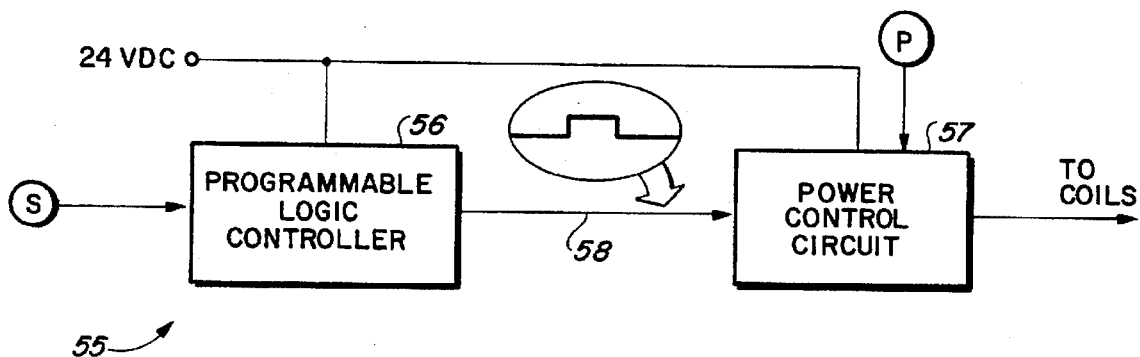
FIG. 15 illustrates the use of the claimed device as a pulsed direct current power source.

It is also possible to operate the device of the invention as a motor using a pulsed direct-current power source. A control system 55 for providing such operation is illustrated in FIG. 15. Incorporated in the control system 55 are a rotor position sensor S, a programmable logic controller 56, a power control circuit 57 and a potentiometer P.

Based on signals received from sensor S, controller 56 determines the appropriate timing for coil excitation to assure maximum torque and smooth operation. This entails the determination of the optimum positions of the rotor and the carousel at the initiation and at the termination of coil excitation. For smooth operation and maximum torque, the force developed by the interacting fields of the magnets and the excited coils should be unidirectional to the extend possible.

Typically, the coil is excited for only 17.5 degrees or less during each 40 degrees of rotor rotation.

The output signal 58 of controller 56 is a binary signal (high or low) that is interpreted as an ON and OFF command for coil excitation.

The power control circuit incorporates a solid state switch in the form of a power transistor or a MOSFET. It responds to the control signal 58 by turning the solid state switch ON and OFF to initiate and terminate coil excitation. Instantaneous voltage amplitude supplied to the coils during excitation is controlled by means of potentiometer P. Motor speed and torque are thus responsive to potentiometer adjustments.

The device is also adaptable for operation as a motor using a commutator and brushes for control of coil excitation. In this case, the commutator and brushes replace the programmable logic controller and the power control circuit as the means for providing pulsed d-c excitation. This approach is less flexible but perhaps more efficient than the programmable control system described earlier.

It will now be recognized that a novel and useful generator has been provided in accordance with the stated objects of the invention, and while but a few embodiments of the invention have been illustrated and described it will be apparent to those skilled in the art that various changes and modifications may be made therein without departing from the spirit of the invention or from the scope of the appended claims.

What is claimed is:

1. A device for converting rotational motion into electrical current and vice versa, the device having a stator, a rotor, means for rotating said rotor, and means for transmitting electrical current, the device comprising:

said stator having a plurality of coils, each of said coils having an interior and an exterior, the interiors of said coils being oriented along the circumference of a circle, the coils being in electrical communication with the transmitting means;

said rotor having a plurality of permanent magnets, said permanent magnets being arranged in a configuration having a plurality of sectors equal to the plurality of coils, with alternating sectors being populated with one or more permanent magnets and the remaining sectors being unpopulated, said permanent magnets traversing the exterior of said coils during rotor rotation, and a carousel being positioned to pass through the interior of said coils during rotor rotation, the carousel having carousel magnets mounted thereon wherein one or more carousel magnets correspond to each of said populated sectors, each of said carousel magnets being magnetically locked to the permanent magnets of said corresponding populated sectors.

2. The device according to claim 1 being an electrical generator.

3. The device according to claim 1 being a motor.

4. The device according to claim 2 wherein said populated sectors comprise two permanent magnets mounted in magnetic opposition to each other, said two permanent magnets being positioned opposite each other in the interior of said coil, said two permanent magnets being magnetically oriented perpendicular to said carousel magnets.

5. The device according to claim 2 wherein said populated sectors comprise three permanent magnets positioned on the exterior of said coil, said three permanent magnets having like poles faces directed towards said exterior of said coil and perpendicular to the faces of the carousel magnets.

6. The device according to claim 1 further comprising a housing which encloses said stator and said rotor, said stator being mounted on said housing.

7. The device according to claim 1 wherein the carousel comprises an upper retaining ring and a lower retaining ring, said carousel magnets being mounted therebetween.

8. The device according to claim 7 further comprising an air bearing supporting said carousel.

9. The device according to claim 1 comprising an even number of sequential coils.

10. The device according to claim 1 wherein:

the north poles of said carousel magnets are positioned to face each other so as to confine and to channel the flux in a desired path thereby eliminating magnetic yokes and coil laminations for that purpose.

11. The device according to claim 9 wherein in the means for transmitting electrical current further comprises an odd number group wherein the odd numbered coils are wound clockwise, and an even number group wherein the even numbered coils are wound counterclockwise wherein all coils are in phase with sequential magnetic fields having opposite polarities.

12. The device according to claim 11 wherein the means for transmitting electrical current wherein the odd numbered coils are electrically connected in parallel to each other, and wherein the even numbered coils are electrically connected in parallel to each other, and further wherein said odd number group is electrically connected in series with said even number group, the resulting electrical current being transmitted to a point of use.

13. The device according to claim 12 wherein the coils are electrically connected so that fundamental components of serially connected coils will be additive.

14. The device according to claim 12 wherein alternate coils of said even number of sequential coils are designated as even numbered coils and the remaining coils are designated as odd numbered coils;

said coils being connected in any of various series and parallel combinations with all parallel branches containing equal numbers of even numbered and odd numbered coils, and the fundamental components of serially connected even numbered coils and odd numbered coils are rendered additive according to claim 11 or 12.

15. The device according to claim 1 wherein two carousel magnets are mounted per each populated sector.

16. The device according to claim 1 wherein three permanent magnets are mounted in each populated sector of said rotor and three carousel magnets are mounted in each populated sector of said carousel, said permanent magnets being arranged to move past three adjacent outer sides of the coil, said carousel magnets being arranged to move past the same three adjacent sides of the coil as they pass through the inside of the coil, each of said three carousel magnets being aligned opposite a corresponding one of said three permanent magnets.

17. The device according to claim 1 comprising eighteen coils, wherein said populated sectors comprise three permanent magnets positioned on the exterior of each coil, said three permanent magnets having like pole faces directed towards said exterior of said coil and perpendicular to the faces of said carousel magnets, and further wherein two carousel magnets are mounted per each populated sector.

18. The device according to claim 3 wherein:

said coils are excited by a pulsed d-c voltage under the control of a control system comprising a rotor position sensor, a programmable logic controller and a power control circuit.

19. The device according to claim 18 with the further incorporation of a potentiometer for use as a speed control.

20. The device according to claim 1 having stationary elements that are exposed to strong magnetic field patterns, said stationary elements being fabricated from Delrin or Teflon plastic or equivalent.

21. The device according to claim 1 wherein four carousel magnets correspond to each of said populated sectors.

22. The device according to claim 21 wherein each of said populated sectors of said rotor has four permanent magnets, each positioned opposite a corresponding one of said four carousel magnets about the four sides of one of said coils as said rotor and said carousel move past said coil.

* * * * *